United States Patent Office 2,938,103
Patented May 24, 1960

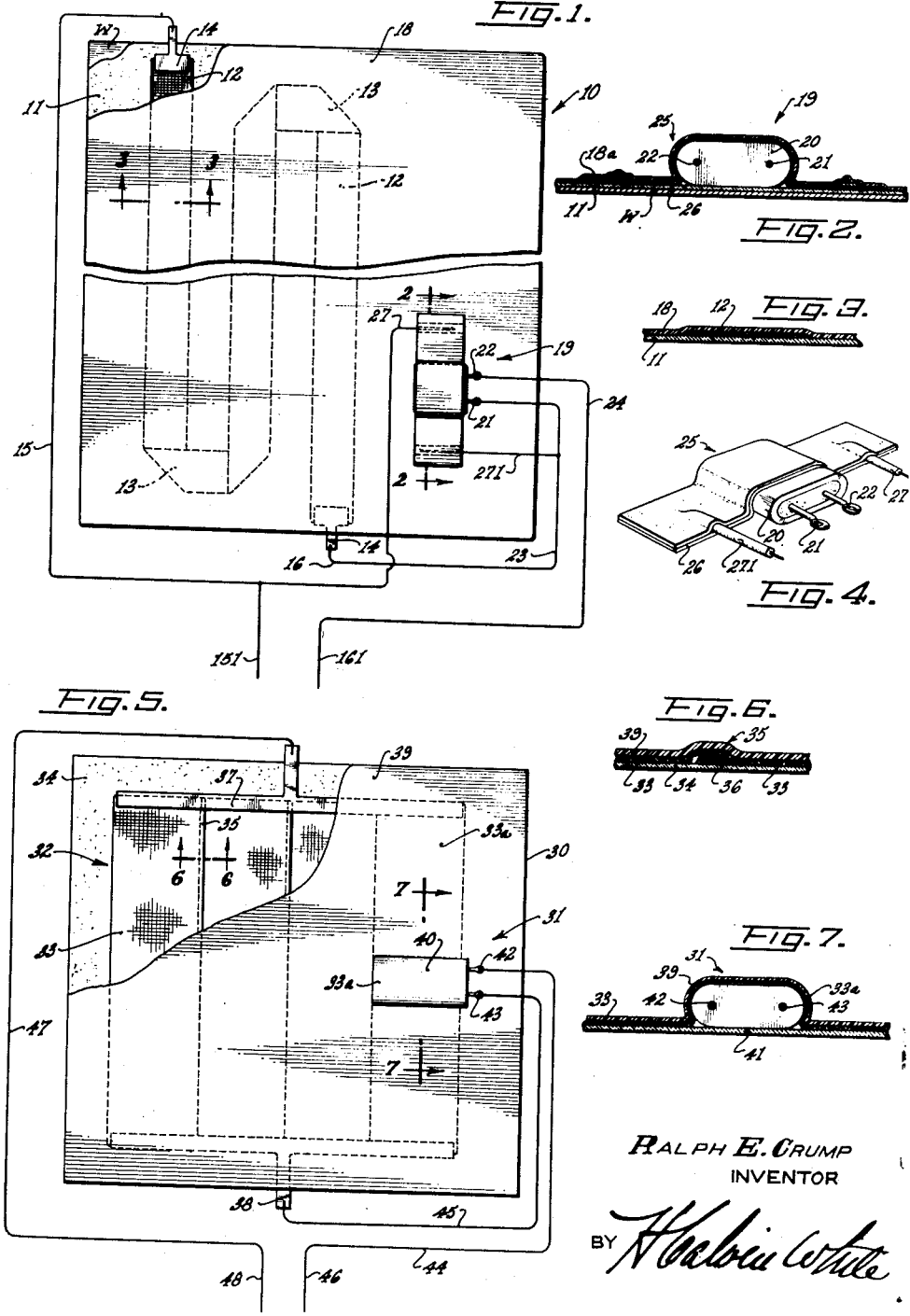

2,938,103

THERMOSTAT-CARRYING ELECTRICAL HEATING MATERIALS FOR SURFACE APPLICATION

Ralph E. Crump, Granada Hills, Calif., assignor to Electrofilm, Inc., North Hollywood, Calif., a corporation of California Filed Apr. 11, 1958, Ser. No. 727,873

10 Claims. (Cl. 219—46)

This invention has to do with improvements in electrically energized heating elements or materials made in essentially sheet form for application to the surfaces of objects to be heated, such for example as airplane parts subjectable to low temperatures, the housings of instruments whose proper functioning is dependent upon close temperature control, surfaces subject to icing, radiant heating areas, and altogether a wide variety of uses. In this majority of instances the present type of heating element or material is made thin, say in the range of about 0.10 to 0.25 inch, and in essentially sheet form in the sense that its area and thinness permit application of the element to planar or irregular, e.g. curved, surfaces. For various purposes the components of the element, i.e. the resistance heating means and electrical insulating material, may be prefabricated as a completed unit requiring only application, as by adhesion, to the surface to be heated. Or completion of the unit to operating condition, as by the application or curing of resinous components, may occur at the time of application of the unit to the work.

The invention has particular, though typical applicability to electrical heating materials comprising a resistance heating means given such distribution within or across the area of the sheet as to afford substantially uniformly distributed heating, together with a resinous component serving the several functions of insulating and fixing the position of the insulating means, lending integrated continuity to the sheet, and rendering the latter resistant to the elements as well as to chemical attack. Particularly good results have been achieved by adhering the metallic resistance heating means to a non-conductive reinforcing fabric such as woven glass cloth, and fixing and insulating the heating means to the fabric by a thermosetting resin coating.

The present invention is primarily concerned with assuring proper heating performance of the composite material by precluding the possibility of over-heating or localized burn-outs, which may tend to occur during initial current input to the material in bringing it up to operating temperature. The invention has for its general object to obviate such occurences by employing with the element or material one or more devices in the nature of thermostatic anticipators (the number depending upon the particular designs and circuits) which may be carried directly by the sheet material itself and adapted to so limit the current supply to the sheet heating element as to safely limit the temperature rise.

The functional concept behind the thermostatic anticipator, is to connect electrically to the heating element, a thermostat control in an electrical circuit having the same or parallel temperature rise vs. time characteristics as the corresponding characteristics possessed by the heater, which in general depend upon the watt density of the heater and the mass and type of the heat sink. Being so related, the thermostat is enabled to anticipate a predetermined temperature rise of the heating element, and to lessen or discontinue the current feed thereto before over-heating can occur.

In certain specific aspects, the invention contemplates applying the thermostat directly to the surface of the sheet, and removably holding the thermostat thereto by electrically energized resistance means which can serve the dual purposes of retaining the thermostat in place and of electrically heating the thermostat by current flow in any of various circuit relations with the current input to the sheet heating element. As will appear, I preferably so retain the thermostat by a heating element adapted to operate at the same (or definitely related) watt density as the sheet-contained heating means, and thus the two heating means or elements are brought into such correspondence as will assure discontinuance or reduction of the current input to the sheet heating element at a predetermined temperature to which the thermostat is responsive.

A further object of the invention is to employ for the purposes of both the sheet-contained and thermostat-retaining heating elements, interwoven fine metallic wire and insulative (e.g. glass) strands in elongated tape form adapted to be reversed back and forth in the sheet between terminal conductors, and also adaptable for application about and in contact with the thermostat with the ends of the element secured to the sheet. By impregnating the thermostat-retaining element with resin which is cured to hardened form, the element is both insulated and resiliently set in a shape conformable to the thermostat, so that the element and thermostat can constitute a preassembled unit, for use as such.

All the various features and objects of the invention as well as the details of certain typical and illustrative embodiments thereof will be fully understood from the following detailed description of the accompanying drawing, in which:

Fig. 1 is a general view showing the thermostat applied to one form of heating element sheet;

Fig. 2 is an enlarged fragmentary cross-section on line 2—2 of Fig. 1;

Fig. 3 is an enlarged cross-section taken on line 3—3 at one run of the heating element in Fig. 1;

Fig. 4 is a perspective showing of the thermostat and its retaining heating element;

Fig. 5 is a view generally similar to Fig. 1 showing a variational form of sheet heater; and Figs. 6 and 7 are enlarged fragmentary cross-sections taken respectively on lines 6—6 and 7—7 of Fig. 5.

Referring first to Figs. 1 to 4, the heating composite prepared for application to a planar or irregular surface to be heated, is shown typically to comprise a sheet, generally indicated at 10, having one or more base layers 11 of a reinforcing fabric, preferably woven glass cloth, impregnated with an insulating material in the general class of plastics, elastomeric or non-elastomeric, including such thermosetting resins as phenol formaldehyde, ureal formaldehyde, epoxide, polyester and polysiloxane resins, and such elastomers as the heat resistant silicone rubbers and neoprene. The composite is applied to the surface W of the work to be heated.

Applied to the surface of the impregnated fabric is a heating element 12 which preferably has the form of an elongated tape woven from fine conductive metal wires and alternating non-conductive threads or strands, typically of glass fibers. The conductive and non-conductive strands desirably run both longitudinally and transversely of the tape and may be alternate in the weave. The conductive strands may be of any suitable metal such as alloys of nickel (e.g. nickel-chrome), tungsten, aluminum, stainless steel, Monel metal and the like. As will be understood, the non-conductive strands hold the conductor wires in predetermined spaced relation so that the overall mesh formed by the strands can be given an accurately predeterminable electrical resistance and heating characteristic. Desirably, the total cross-sectional area of the non-conductive strands running longitudinally of the tape is greater than the total cross-sectional area of the conductors extending in the same direction. The same is also preferably true of the transverse conductors and non-conductors. The individual conductive wires may be as small as .0000002 square inch in cross-sectional area, and 0.005 inch in diameter, while the mesh sizes of the heating element may range typically between about 10 to 400 strands per inch.

For further details concerning this type of heating element and composite sheet material containing it, reference may be had to the co-pending Heath application Serial No. 644,070, filed March 5, 1957, and owned by the assignee of the present invention.

For distributed heating across the area of the sheet, the tape 12 may be reversed back and forth with folded-over corners at 13, in whatever pattern and extent needed to serve the heat distribution requirements in any given instance. The tape has conductive metal terminals 14 to which current is supplied through conductors 15 and 16 connecting with the current supply leads 151 and 161.

The heating element tape is held in its pre-arranged position and given along with the remaining surface area of the sheet, a protective and insulative coating 18 consisting of a thin layer of any of the aforementioned plastics, inclusive of the resins and heat-resistant elastomers. The coating 18 may conveniently be given spray application and air dried in the case of those plastics capable of atmospheric temperature cure, or in the case of plastics which require heating for their cure and hardening, the coated sheet may be baked at a temperature range of say from 200 to 400° F.

The invention is primarily concerned with the anticipator thermostatic control, generally indicated at 19, which is shown to be applied to the sheet in offset relation to the heating element 12. The thermostat proper may consist typically of temperature responsive parts within a small housing 20 and having poles 21 and 22 which through conductors 23 and 24 connect with leads 16 and 161 thus putting the thermostat in series with the element 12. The thermostat is releasably retained within a heating element 25 in the form of a conductive strap which constitutes the heater component of the anticipator and preferably is made to operate at the same watt density as the heating element 12. For this purpose, the anticipator heater may comprise a relatively short length or strap 26 of conductive tape like that used in the element 12, in electrical series or parallel connection with the main heating element. The strap 26 carries conductive terminals 27 and 271 which are connected respectively with conductors 15 and 16 thus, in this instance, to have the strap in parallel connection with the element 12.

In assembly, the strap 26 with its terminals may be applied to the surface of the impregnated glass fabric lamination 11, before or after application of the plastic surface coating 18. Typically, in the same operation the plastic may be applied and cured over the entire sheet area to cover both the element 12 and the strap 26, the insulative strap coating appearing at 18a in Figs. 2 and 4. As will be understood, if desirable for additional reinforcement, the strap 26 may be applied to or carried by a corresponding size base lamination of resin-impregnated glass fabric.

Alternatively, the conductive strap 26 may be made in advance, and in its deflected form for accommodation of the thermostat, by pre-coating the strap with plastic 18a, with or without a base impregnated glass cloth lamination, and subsequently applying the strap to the sheet 10, though preferably before application of its surface coating 18.

Being impregnated with the cured plastic, the laminated strap 25 has a hardened shape-retaining composition closely conforming to the surface configuration of the thermostat so as to retain the latter even independently of the sheet to which the thermostat and strap assembly is applied. The strap has sufficient resiliency to permit removal and replacement of the thermostat.

The thermostat 20 is responsive to heating of the conductive strap 26 so that during the warm-up period, the thermostat operates to maintain the current supply from leads 151 and 161 through the element 12 and the thermostat heater. Thus the strap 26 and tape 12 have closely corresponding rates and degrees of temperature increase. When the temperature reaches the level at which it is predetermined to respond, the thermostat opens to discontinue the current supply to the element 12, thus precluding the possibility of excessive temperature rise.

Figs. 5 to 7 illustrate a variational form of the invention in which the sheet composite 30 and thermostatic control generally indicated at 31 correspond to the Fig. 1 embodiment, except that a different form of heating element, generally indicated at 32, is employed, and the direct thermostat heating means is in effect is in series-connected relation with the main heating element. Here the total element comprises a plurality of parallel heating resistance bands or strips typically of conductive tape 33 woven like the previously described element 12, placed upon the base impregnated glass fabric lamination 34 with the edges of the tapes overlapping at 35, as best illustrated in Fig. 6. Current flow laterally from any of the individual tape lengths 33 to the adjacent overlapping tape edge is prevented by strips of thin insulating material, typically sheet mica 36, interposed between the edge portions at their overlap. With the tape lengths 33 so arranged and connected at their ends to common conductive terminals 37 and 38, complete uniformity of heating is assured throughout that area of the sheet occupied by the overlapped elements. The latter may be coated over, as before, with a surface layer 39 of a protective and insulative cured plastic.

Reference previously has been made to the suitability of supplying heat to the thermostat from a source in series connection with the main heating element. Fig. 5 shows this feature, together with employment of an area of the element itself as the heat source. Here one section 33a of the element is placed about the thermostat 40 engaged against the base sheet 41, the tape 33a being raised only throughout that extent of its length necessary to cover the thermostat. Application of the cured resinous surface coating 39 to the tape assures a substantially rigidized receptacle for the thermostat. The latter has its poles 42 and 43 connected by conductors 44 and 45 respectively with one of the heating element current supply leads 46 and with terminal 38 so that the thermostat is in series with the heating element having its other terminal 37 connected through conductor 47 with a second supply lead 48.

I claim:

1. The combination comprising a sheet-like base composed of electrical resistance heating means and insulation material arranged for heat distribution across the base, a thermostat carried on the surface of said base, and means for electrically heating the thermostat comprising a heating element bonded to the base at locations adjacent both sides of the thermostat and deflected upwardly about and in engagement with the sides and top of the thermostat to hold it to the base, said thermostat being adapted to be electrically connected to the heating means to control current supply thereto.

2. The combination according to claim 1, in which said heating element is in essentially tape form.

3. The combination according to claim 1, in which said electrical resistance heating means is in essentially tape form bonded to said base and said heating element is of similar tape form.

4. The combination according to claim 1, in which said electrical resistance heating means has terminal circuit supply connections and said thermostat and heating element are offset on the base from said resistance heating means.

5. The combination according to claim 1, in which said electrical resistance heating means and heating element both are composed of wire mesh in tape form coated with a resin.

6. The combination according to claim 5, in which said base is resin-impregnated glass cloth and said thermostat is openly accessible at the surface of the base.

7. The combination according to claim 1, in which said heating element holding the thermostat is a portion of said electrical resistance heating means.

8. The combination comprising a thermostat, and a tape-like element composed of electrical heating means and insulation material in fixed resiliently flexible form deflected about the top and sides of the thermostat in contact therewith and having free ends attachable to a surface, and electrical terminals carried by said element.

9. The combination of claim 8, in which said element releasibly retains the thermostat.

10. The combination of claim 8, in which said element comprises a layer of glass fabric and said heating means is composed of interwoven wires and insulation strands, said element being impregnated with resin hardened to retain the deflected shape of the element.

References Cited in the file of this patent

UNITED STATES PATENTS

| | | |
|---|---|---|
| 1,992,593 | Whitney | Feb. 26, 1935 |
| 2,032,294 | McDonald | Feb. 25, 1936 |
| 2,421,953 | MacKendrick | June 10, 1947 |
| 2,441,005 | Bradford | May 4, 1948 |
| 2,503,457 | Speir et al. | Apr. 11, 1950 |
| 2,511,540 | Osterheld | June 13, 1950 |
| 2,572,695 | Briscoe et al. | Oct. 23, 1951 |
| 2,698,893 | Ballard | Jan. 4, 1955 |
| 2,719,907 | Combs | Oct. 4, 1955 |